US008463760B2

(12) United States Patent
Himstedt et al.

(10) Patent No.: US 8,463,760 B2
(45) Date of Patent: Jun. 11, 2013

(54) SOFTWARE DEVELOPMENT TEST CASE MANAGEMENT

(75) Inventors: Kevin Paul Himstedt, Wildwood, MO (US); Rudolph Joseph Holthuis, Benicia, CA (US); Steven Earnest Maples, Roseville, CA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 112 days.

(21) Appl. No.: 12/333,757

(22) Filed: Dec. 12, 2008

(65) Prior Publication Data
US 2010/0057693 A1 Mar. 4, 2010

Related U.S. Application Data

(60) Provisional application No. 61/094,409, filed on Sep. 4, 2008.

(51) Int. Cl.
G06F 7/00 (2006.01)

(52) U.S. Cl.
USPC .......................................... 707/694

(58) Field of Classification Search
USPC .......................... 707/700, 702, 694
See application file for complete search history.

(56) References Cited

U.S. PATENT DOCUMENTS

| | | | |
|---|---|---|---|
| 6,182,245 B1 | 1/2001 | Akin et al. | |
| 6,668,340 B1 | 12/2003 | Baker et al. | |
| 6,928,393 B2 | 8/2005 | Czerwonka | |
| 7,165,074 B2 | 1/2007 | Avvari et al. | |
| 7,167,870 B2 | 1/2007 | Avvari et al. | |
| 7,299,382 B2 | 11/2007 | Jorapur | |
| 7,313,564 B2 | 12/2007 | Melamed et al. | |
| 7,523,425 B2 | 4/2009 | Bunin et al. | |
| 7,552,422 B2 | 6/2009 | Gerber et al. | |
| 7,644,398 B2 | 1/2010 | Cleaveland et al. | |
| 7,685,468 B2 | 3/2010 | Copstein et al. | |
| 2003/0204784 A1 | 10/2003 | Jorapur | |
| 2003/0212661 A1 | 11/2003 | Avvari et al. | |
| 2003/0212924 A1 | 11/2003 | Avvari et al. | |
| 2004/0073890 A1 | 4/2004 | Johnson et al. | |
| 2004/0107415 A1 | 6/2004 | Melamed et al. | |
| 2004/0260516 A1 | 12/2004 | Czerwonka | |
| 2005/0160321 A1 | 7/2005 | Cleaveland et al. | |
| 2005/0251719 A1 | 11/2005 | Gerber et al. | |
| 2005/0283761 A1* | 12/2005 | Haas | 717/124 |
| 2006/0005067 A1* | 1/2006 | Llyod, Jr. | 714/4 |
| 2006/0010428 A1 | 1/2006 | Rushby et al. | |
| 2006/0010429 A1 | 1/2006 | Ihara | |
| 2007/0006037 A1 | 1/2007 | Sargusingh et al. | |
| 2007/0016829 A1 | 1/2007 | Subramanian et al. | |
| 2007/0162894 A1 | 7/2007 | Noller et al. | |
| 2007/0169015 A1 | 7/2007 | Seelig et al. | |
| 2007/0174711 A1 | 7/2007 | Uehara et al. | |
| 2007/0250799 A1 | 10/2007 | Bunin et al. | |
| 2008/0215921 A1 | 9/2008 | Branca et al. | |
| 2008/0294941 A1 | 11/2008 | Copstein et al. | |
| 2009/0094486 A1 | 4/2009 | Dipper et al. | |
| 2009/0300423 A1 | 12/2009 | Ferris | |
| 2010/0058294 A1 | 3/2010 | Best et al. | |
| 2010/0070231 A1 | 3/2010 | Hanumant | |

* cited by examiner

Primary Examiner — Truong Vo

(57) ABSTRACT

A method of extending features provided by a test case management (TCM) application, includes, in response to user input defining a date range and specifying at least one test target, generating a test report based on test data generated via the TCM application during the defined date range, wherein the test report is indicative of one or more test status indicators relative to the test target(s).

18 Claims, 16 Drawing Sheets

| % Through Schedule | | Target % | | |
|---|---|---|---|---|
| From % | To % | Execution | Passing | Sev1 |
| 0 | 4.99 | 5 | 5 | 5 |
| 5 | 9.99 | 10 | 10 | 10 |
| 10 | 14.99 | 15 | 15 | 15 |
| ⋮ | ⋮ | ⋮ | ⋮ | ⋮ |
| 90 | 94.99 | 85 | 80 | 20 |
| 95 | 99.99 | 90 | 100 | 10 |
| -- | 100+ | 100 | 105 | 0 |

[Submit Targets] [Reset]

*FIG. 6*

Edit Test Execution Data

Start Date: 09/01/2007   End Date: 12/31/2009

Note: only the most recent set of test data is used for reports. If an error is made, simply re-enter the data

| Date | Planned | Executed | Passed | Failed | Held/Blocked |
|---|---|---|---|---|---|
| 11/12/2007 | | | | | |
| 11/11/2007 | 1000 | 770 | 654 | 9 | 1 |
| 11/11/2007 | 500 | 200 | 190 | 10 | 0 |
| 11/11/2007 | 1000 | 700 | 190 | 10 | 10 |

[ Update Test Data ]   [ Reset ]

*FIG. 7*

| Project | MassMarket_2007_10 |
| Program | Other |
| Application | BBTi |
| Project ID | *NEW |

Add New Item

New Item Name [_____] ⤴812
Start Date (IPP Start) (mm/dd/yyyy) [_____] ⤴814
End Date (IPP End) (mm/dd/yyyy) [_____] ⤴816

810⤵

Support Role? ○ Yes ○ No ⟵820
(not counted in test metric totals)
Regression? ○ Yes ○ No ⟵822

[Add Item] [Reset]

Monthly Defect Cause Summary
Domain: ATT - Project: ATT_IT
Program: Other
Orig Application: 5620 SAM, A/R, CRM, SDP, Xng/Granite
Group: Billing
Include Closed: Yes

| Total All Applications | | | | | | | | | |
|---|---|---|---|---|---|---|---|---|---|
| Defects Found in Test | 0701 | 0702 | 0703 | 0704 | 0705 | 0706 | 0707 | 0708 | 0709 |
| Integration Test | 1 | 0 | 0 | 0 | 0 | 0 | 0 | 0 | 0 |
| Production | 1 | 3 | 2 | 5 | 5 | 1 | 0 | 0 | 0 |
| Regression Testing | 0 | 0 | 1 | 1 | 0 | 1 | 0 | 0 | 0 |
| System Test | 0 | 2 | 1 | 0 | 0 | 0 | 0 | 0 | 0 |
| Unit Test | 0 | 0 | 2 | 0 | 1 | 0 | 0 | 0 | 0 |
| Total | 2 | 5 | 6 | 6 | 6 | 2 | 0 | 0 | 0 |
| Root Cause of Defects Found in Test | | | | | | | | | |
| 1.1 BR/CR (Business Req/Client Req) | 0 | 0 | 1 | 0 | 0 | 0 | 0 | 0 | 0 |
| 1.1 BR/TR (Business Req/Technical Req) | 0 | 0 | 1 | 0 | 0 | 0 | 0 | 0 | 0 |
| 10.1 CCB Cancel | 0 | 0 | 0 | 0 | 0 | 0 | 0 | 0 | 0 |
| 10.2 Duplicate | 0 | 0 | 0 | 1 | 0 | 0 | 0 | 0 | 0 |
| 10.3 Incorrect Expected Result | 0 | 0 | 1 | 0 | 0 | 0 | 0 | 0 | 0 |
| 10.4 Not a defect | 1 | 2 | 0 | 1 | 0 | 0 | 0 | 0 | 0 |
| 10.5 Unable to recreate defect | 0 | 0 | 1 | 0 | 0 | 0 | 0 | 0 | 0 |
| 2.1 Detail Design | 0 | 0 | 0 | 1 | 0 | 0 | 0 | 0 | 0 |
| 3.1 Code | 0 | 0 | 0 | 1 | 1 | 1 | 0 | 0 | 0 |
| 3.1 Work Product - Other | 1 | 0 | 2 | 0 | 0 | 0 | 0 | 0 | 0 |
| 4.1 Scheduling | 0 | 0 | 0 | 0 | 0 | 1 | 0 | 0 | 0 |
| Unknown/Other | 0 | 1 | 2 | 1 | 4 | 0 | 0 | 0 | 0 |
| Total | 2 | 5 | 6 | 6 | 6 | 2 | 0 | 0 | 0 |

| BBTi | | | | | | | | | |
|---|---|---|---|---|---|---|---|---|---|
| Month | 0701 | 0702 | 0703 | 0704 | 0705 | 0706 | 0707 | 0708 | 0709 |
| Defects Found in Test | | | | | | | | | |
| Regression Testing | 0 | 0 | 0 | 0 | 0 | 0 | 0 | 1 | 0 |
| Total | 0 | 0 | 0 | 0 | 0 | 0 | 0 | 1 | 0 |
| Root Cause of Defects Found in Test | | | | | | | | | |
| 6.4 Not a defect | 0 | 0 | 0 | 0 | 0 | 0 | 0 | 1 | 0 |
| Total | 0 | 0 | 0 | 0 | 0 | 0 | 0 | 1 | 0 |

Severity — Range for number of days delivered — Click on # to open defect detail report for selected defects

| Delivery Time | 1-7 days | 8-14 days | 15-21 days | 22+ days | Total | Average Delivery Time |
|---|---|---|---|---|---|---|
| Sev 1 | 16 | 3 | 0 | 0 | 19 | 0.00 |
| Sev 2 | 60 | 5 | 1 | 1 | 67 | 0.34 |
| Sev 3 | 84 | 10 | 1 | 1 | 96 | 0.25 |
| Total | 160 | 18 | 2 | 2 | 182 | 0.59 |

1302

1304

Severity — Range for number of days in Retest — Click on # to open defect detail report for selected defects

| Retest Time | 1-7 days | 8-14 days | 15-21 days | 22+ days | Total | Average Retest Time |
|---|---|---|---|---|---|---|
| Sev 1 | 31 | 0 | 0 | 0 | 31 | 0.00 |
| Sev 2 | 143 | 1 | 0 | 0 | 144 | 0.32 |
| Sev 3 | 156 | 0 | 0 | 0 | 156 | 0.22 |
| Total | 330 | 1 | 0 | 0 | 331 | 0.54 |

Defects in Open Status

QC Domain: STANDARD_PROJECT_STRUCTURE
QC Project: MASSMARKET_2007_10

Severity — Range for number of days open — Filters: Application: Program: 'Other' — Click on # to open defect detail report for selected defects

| | 1-7 days | 8-14 days | 15-21 days | 22+ days | Total |
|---|---|---|---|---|---|
| Sev 1 | 0 | 0 | 2 | 4 | 6 |
| Sev 2 | 0 | 12 | 18 | 24 | 54 |
| Sev 3 | 0 | 29 | 15 | 10 | 54 |
| Total | 0 | 41 | 35 | 38 | 114 |

*FIG. 14*

| Ownership | Test Case Metrics | | | | Defect Metrics | | | | | % Exec vs. Target | | | | % Pass vs. Target | | | | % Sev 1 Defects vs. Target | | | |
|---|---|---|---|---|---|---|---|---|---|---|---|---|---|---|---|---|---|---|---|---|---|
| | | | | Sev-1 Waiting Action | Open Defects | | | | | | % Of Total Cases Application | | | Pass Rate | % Of Total Cases Passing | % Pass vs. Target Application | | | % Of Defects Application | | |
| | Total | Exec | Pass | | Sev-1 | Sev-2 | Sev-3 | Total | | Exec | Target | Status | | | Target | Status | Sev. 1 | Target | Status |
| | T1 | T2 | T3 | D1 | D2 | D3 | D4 | D5 | T4 | T5 | T6 | T7 | T8 | T9 | T10 | D6 | D7 | D8 |
| Group AAA | | | | | | | | | | | | | | | | | | | |
| Application 1 | 179 | 127 | 122 | 0 | 11 | 0 | 0 | 11 | 71% | 98% | Behind | 96% | 68% | 96% | Behind | 100% | 0% | Behind |
| Application 1 - Regression | 160 | 142 | 140 | 0 | 0 | 0 | 0 | 0 | 89% | 0% | Ahead | 33% | 88% | 0% | Ahead | 0% | 20% | Ahead |
| Application 2 | 0 | 0 | 0 | 0 | 61 | 97 | 23 | 181 | 0% | 98% | Behind | 0% | 0% | 96% | Behind | 34% | 0% | Behind |
| Application 2 - Regression | 0 | 0 | 0 | 0 | 0 | 0 | 0 | 0 | 0% | 0% | OK | 0% | 0% | 0% | OK | 0% | 20% | Ahead |
| Application 3 | 241 | 241 | 241 | 1 | 11 | 0 | 0 | 11 | 100% | 38% | Ahead | 100% | 100% | 96% | Ahead | 100% | 0% | Behind |
| Application 4 | 220 | 220 | 220 | 0 | 0 | 0 | 0 | 0 | 100% | 0% | Ahead | 100% | 100% | 0% | Ahead | 0% | 20% | Ahead |
| Group AAA NEW | 1550 | 1464 | 1442 | 202 | 4366 | 4164 | 776 | 9326 | 77% | *57% | Ahead | 91% | 76% | *55% | Ahead | 33% | 13% | Behind |
| Group AAA REGRESSION | 1154 | 1036 | 1033 | N/A | N/A | N/A | N/A | N/A | | N/A | | | | N/A | | N/A | N/A | |
| Group AAA Total | 2704 | 2500 | 2475 | 282 | 4386 | 4164 | 776 | 9326 | 92% | 98% | Behind | 99% | | | | | | |
| TOTAL NEW SUMMARY | | | | | | | | | | | | | | | | | | | |
| REGRESSION SUMMARY | | | | N/A | N/A | N/A | N/A | N/A | | | | | | | | | | |
| TOTAL SUMMARY | 2704 | 2500 | 2475 | 282 | 2193 | 2082 | 388 | 4663 | 92% | 98% | Behind | 99% | | | | | | |

Internal Metrics Web Site Info

| Defect Fields | | | | Current Metrics |
|---|---|---|---|---|
| Field Name | Mandatory Optional Conditional Auto populated | QC Table Name | QC Field Name | Metrics Table N DB Field |
| Assigned to App | Mandatory | BUG | BG_USER_13 | QC_EXPORT | [Assigned To App] |
| Assigned To UUID | Optional | BUG | BG_RESPONSIBLE | QC_EXPORT | [Assigned To UUID] |
| Closing Date | Auto populated | BUG | BG_CLOSING_DATE | QC_EXPORT | [Closing Date] |
| Defect ID | Auto populated | BUG | BG_BUG_ID | QC_EXPORT | [Defect ID] |
| Defect Mgr Assigned | Optional | BUG | BG_USER_04 | QC_EXPORT | [Defect Mgr Assigned] |
| Detected By | Auto populated | BUG | BG_DETECTED_BY | QC_EXPORT | [Detected By] |
| Detected in Release | Mandatory | BUG | BG_USER_05 | QC_EXPORT | [Detected in Release] |
| Detected On Date | Auto populated | BUG | BG_DETECTION_DATE | QC_EXPORT | [Detected on Date] |
| Modified By | Auto populated | BUG | BG_USER_52 | QC_EXPORT | [Modified By] |
| Modified Date | Auto populated | BUG | BG_USER_67 | QC_EXPORT | [Modified Date/Time] |
| Phase Found In | Mandatory | BUG | BG_USER_01 | QC_EXPORT | [Phase Found In] |
| Project ID (PMT) | Mandatory | BUG | BG_USER_07 | QC_EXPORT | [PMT/EAP] |
| Program | Mandatory | BUG | BG_USER_06 | QC_EXPORT | Program |
| Root Cause Category | Conditional | BUG | BG_USER_02 | QC_EXPORT | [Root Cause Category] |
| Severity | Mandatory | BUG | BG_SEVERITY | QC_EXPORT | Severity |
| Status | Mandatory | BUG | BG_STATUS | QC_EXPORT | Status |
| Type | Mandatory | BUG | BG_USER_61 | QC_EXPORT | Type |

1800

SOFTWARE DEVELOPMENT TEST CASE MANAGEMENT

BACKGROUND

1. Field of the Disclosure

The present disclosure relates to software development and, more particularly, managing software development processes using test case management.

2. Description of the Related Art

In the field of software development and testing, software developers have historically had to generate individual metrics in order to manage the software development testing cycle. In doing so, teams have leveraged a wide range of tools and processes and have generated non-standard metrics which can be difficult to analyze/compare at different levels of management.

BRIEF DESCRIPTION OF THE DRAWINGS

FIG. 6 depicts an exemplary embodiment of a user interface for specifying a set of testing targets for three test benchmark categories;

FIG. 7 depicts an exemplary embodiment of a user interface for manually inputting test data;

FIG. 8 depicts an exemplary embodiment of an interface for manually entering a new program, application, or project;

FIG. 9 depicts an exemplary embodiment of a monthly defect cause report;

FIG. 11 depicts an exemplary embodiment of a defect status report;

FIG. 13 depicts an exemplary embodiment of a defect turnaround report;

FIG. 14 depicts an exemplary embodiment of a defects in open status report;

FIG. 15 depicts an exemplary embodiment of a test coverage status report;

FIG. 18 depicts selected elements of a defect management template.

DESCRIPTION OF THE EMBODIMENT(S)

Figure 1:
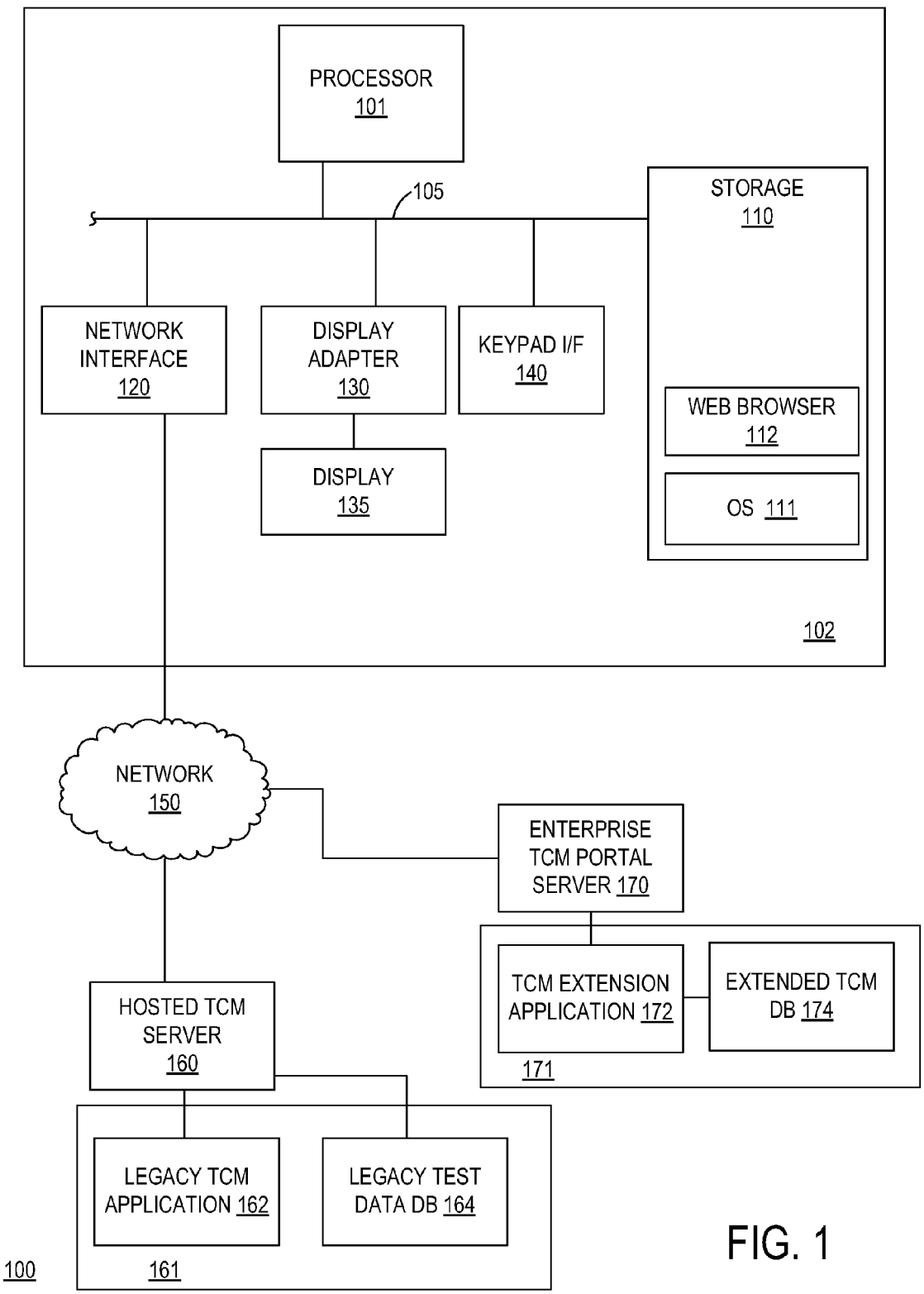
FIG. 1 is a block diagram of selected elements of an embodiment of a system and network for test case management.

Subject matter disclosed herein describes the use of test plan and defect templates, in conjunction with a legacy test case management (TCM) application, along with an application extension that facilitates extending test metrics beyond those supported by the legacy TCM application. The extended metrics support includes support for using date ranges for filtering test data and test targets to enhance progress metrics. The application extension supports selective retrieval and analysis of legacy test data based on hierarchically-based parameters associated with the test including as examples, business unit, program, application, project, and so forth, making them reusable for all levels of management.

Pre-existing templates may be leveraged by individual business units to identify data points required to generate extended metrics. Leveraging existing templates saves time and is beneficial at the individual team level in creating extended metrics. Data is pulled directly from a legacy TCM application thereby increasing data integrity. Standard calculations may used and published to communicate how each metric is created and what the metric is communicating.

The disclosed subject matter reduces the effort required by individual development teams to create and communicate testing metrics. The disclosed subject matter also creates a standard and consistent method of generating data that is easy to understand and introduces time lines and targets being leveraged to measure testing progress.

In one aspect, a method of performing test case management for a software development project is disclosed. The method includes receiving input defining a selected portion of legacy test data, a date range, and one or more test targets. The selected portion of legacy test data may be specific to or otherwise associated with a particular software development project. A test target may be specified for each of a set of at least one test benchmark categories.

The selected portion of the legacy test data may be filtered based on the date range. Test values for at least some of the benchmark categories may be determined based on the filtered portion of the legacy test data. The test values may be compared to applicable test targets. A report, including information indicating a result of the comparing, may then be generated. In some embodiments, the types of reports may include a system test coverage status report, a test progress report, a defect turnaround report, a defect root cause report, as well as other suitable reports.

The legacy test data may include data generated by a legacy TCM application including, for example, an application that includes elements of the Quality Center application from Hewlett Packard (HP). In some embodiments, the legacy test data is organized in a tiered hierarchy with, for example, a business unit tier, a program tier, an application tier, and so forth. The legacy test data may include information that indicates to which business unit, program, application, and so forth the test data pertains. In these embodiments, receiving input defining the selected portion of legacy test data may include receiving input selecting a value for at least one of the one or more of the hierarchically arranged tiers of the legacy test data. The business unit tiers may be indicative of a business unit within an enterprise, the program subset may be associated with a group of projects supporting a product or service of the business unit, and the application subset may be associated with an information technology resource that supports or enables a defined functionality. In some embodiments, receiving the input defining the date range may include receiving input defining the date range for one of the test data tiers, e.g., at the business unit level, and applying the date range to hierarchically lower tiers, e.g., at the program or application level.

In some embodiments, the test targets may include test targets for each of a plurality of test cycle stages. Each of the test cycle stages may correspond to a percentage of planned tests, e.g., a test cycle stage corresponding to a point at which 25% of the planned test cases have been executed, a test cycle stage corresponding to a point at which 50% of the planned test cases have been executed, a test cycle stage corresponding to a point at which 75% of the planned test cases have been executed, and so forth.

The test targets may include test targets for each of a set of test benchmark categories, including, as examples, a test benchmark category for the number of tests passed, the number of severe defects, the number of tests executed, and so forth. As is true for date ranges, some embodiments support inherency of test targets such that test targets defined at one hierarchical tier may be inherited by lower tiers. This inherency supports uniformity across the lower level tiers while permitting differentiation or customization at all levels of the hierarchy.

In another aspect, a disclosed tangible computer readable storage medium includes computer executable instructions, i.e., software instructions, for facilitating test case management in conjunction with a software development project. The storage medium may include instructions to provide at least one user interface enabling a user to define (a) a subset of legacy test data generated by a legacy test case management application, (b) a date range, and (c) a test target for a test benchmark category. The instructions may further include instructions to generate a test progress report based on a portion of the subset of legacy test data within the defined date range. The test progress report may be indicative of a comparison between the test target and a test metric derived from the portion of the subset of legacy test data.

The instructions to provide at least one interface may include instructions responsive to a request from a web browser. The legacy test data may include, for example, HP Quality Center test data. The test target may be selected from the set of test targets consisting of a target pertaining to the number of tests executed, a target pertaining to the number of tests passed, and target pertaining to the number of highest severity defects. The user interface for defining a subset of legacy test data may enable the user to define the subset according to an enterprise's hierarchical organization. Test data may be segregated or evaluated based on a product group, a program within the product group, and/or an application that supports the program.

In another aspect, a test case management server or system includes a processor, a storage medium accessible to the processor, and instructions executable by the processor for analyzing legacy test data generated by a legacy test case management application. The instructions in the storage medium may include instructions for enabling a user to define a set of test targets, enabling the user to define a date range, and generating a report including, as examples, a test coverage status report or a test progress report, based on the defined subset of legacy test conforming to the defined date range. The legacy test data may be arranged according to a plurality of hierarchical tiers. The instructions for enabling the user to define the date range may include instructions for enabling the user to define the date range at a first of the hierarchical tiers. The date range may then be applied to hierarchical tiers below the first hierarchical tier.

In another aspect, a disclosed method of extending selected features provided by a test case management (TCM) application may include generating a test report based on test data generated by the TCM application during a user-defined date range. The test report may be indicative of a test status relative to a user-defined test target. Defining the test target may include specifying a plurality of test targets for a plurality of test target benchmark categories. In these embodiments, the test report may be indicative of a test status for each of the test target benchmark categories relative to a respective test target.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram depicting selected elements of an embodiment of a network 100 and system 102 suitable use in a test case management application as disclosed herein. In the depicted embodiment, system 102 includes a processor 101, computer readable storage media 110 or, more simply, storage 110, a network interface 120, a display 130, and a keypad interface 140 all connected to a shared bus 105. Storage 110 encompasses all suitable types of computer readable storage media including, as examples, non-volatile memory media including static and dynamic random access memory devices, persistent storage devices including, as examples, magnetic or solid state drive units, optical storage media, read only and programmable read only memory including flash memory devices, and so forth.

Storage 110 may have an instruction portion including instructions executable by processor 101 as well as data portion including data generated by or accessible to processor 101. As depicted in FIG. 1, storage 110 includes instructions in the form of an operating system (OS) 111 and a web browser 112. In this embodiment, it will be apparent that system 102 may access a legacy test case management (TCM) application 160 and/or a TCM extension application 170 via a conventional web browser 112.

Display adapter 130 as shown is connected to a display 135, which may include a liquid crystal (LCD) or other type of display screen. Key pad interface 140 may represent a keyboard or other suitable type of physical input entry.

System 102 may represent a user's desktop or laptop computer at home or at work. In the depicted implementation, network interface 120 connects system 102 with network 150. Network 150 may include elements or portions of a secure or private network, e.g., elements or portions of associated with a network interface, as well as elements or portions of a public network such as the Internet.

Shown connected to network 150 in FIG. 1 are an enterprise TCM portal server 170 as well as a hosted TCM server 160. Hosted TCM server 160 is shown as connected to or otherwise having access to a legacy TCM application 162 and a legacy test data base 164. In some embodiments, legacy TCM application 162 and/or legacy test database 164 may be further provided via storage media 161. Storage 161 may be local to or remote from hosted TCM server 160 itself.

Also shown as connected to network 150 is enterprise TCM portal server 170. TCM portal server 170 is shown connected to a TCM extension application 172 and an extended TCM DB 174 of a storage element identified as storage 171. Storage 171 may be local to or remote from enterprise TCM portal server 170. Both hosted TCM server 160 and enterprise TCM portal server 170 may operate as or include elements of a Web server that includes functionality to respond to web requests including HTTP requests issued by browser 112.

Although TCM extension application 172 and extended TCM database 174 are shown in FIG. 1 stored in a common storage element 171, application 172 and database 174 may be stored in separate databases and/or separate database servers in other embodiments.

Although not shown explicitly, it will be appreciated by those skilled in the design of microprocessor-based computers that enterprise TCM portal server 170 and hosted TCM server 160 may include elements analogous to at least some of the elements depicted for system 102. Thus, for example, hosted TCM sever 160 and enterprise TCM portal server 170 may include a processor, storage accessible to the processor, a network interface and I/O devices analogous to those shown for system 102.

Figure 2:
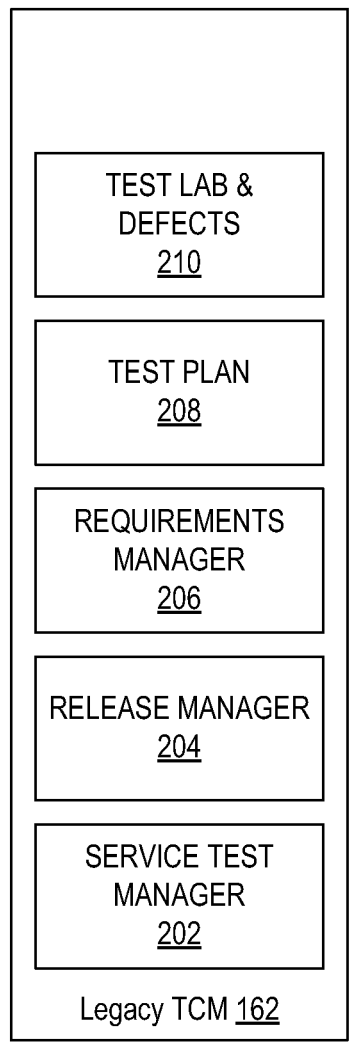
FIG. 2 is a block diagram of selected elements of an embodiment of a legacy test case management application.

FIG. 2 depicts selected elements of a legacy TCM application 162. Legacy TCM application 162 may encompass any suitable test case management tool, defect management tool, and/or change management tool including, as examples, the HP Quality Center application and the Rational® ClearQuest® application from IBM. In the depicted embodiment, legacy TCM application 162 includes various modules including, as examples, a service test manager 202, a release manager module 204, a requirements manager module 206, a test plan module 208, and a test lab and defects module 210 as will be familiar to those skilled in the field of business technology optimization and/or the use of HP Quality Center or another similar application.

Figure 3:
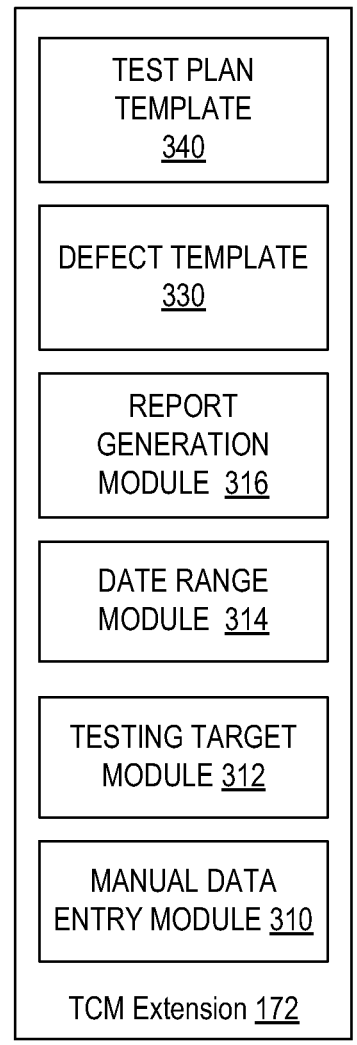
FIG. 3 is a block diagram of selected elements of an embodiment of a test case management extension application.

In FIG. 3, TCM Extension 172 is depicted as including a manual data entry module 310 enabling users to enter test data to Extended TCM DB 174 for test data not supported by legacy TCM 162. A test target module 312 of TCM extension 172 may provide a Web-based or other type of user interface enabling users to define test targets at various levels or tiers of an enterprise's software development or business hierarchy. The test targets may include, for example, targets for the total number of test cases executed, the number or percentage of test cases passing, and the number or percentage of highest severity defects, also sometimes referred to as Severity One defects, all as a function of the software development testing life cycle. These test targets may be included in test status reports to give a uniformly familiar metric of progress across product lines, business units, technology groups, and so forth.

A date range module 314 supports the ability to define a range of dates to filter test data and generate reports. The date ranges may be entered through a Web-based interface or other suitable interface. A report generation module 316 supports the generation of standardized reports that may include the test target information and data indicative of test status relative to the test targets as well as other information and metrics not supported by the legacy TCM application. The depicted embodiment of TCM extension 300 supports the use of a standardized test plan template 240 and a standard defect template 230 that include legacy TCM fields as well as fields developed specifically for the enterprise.

Figure 4:
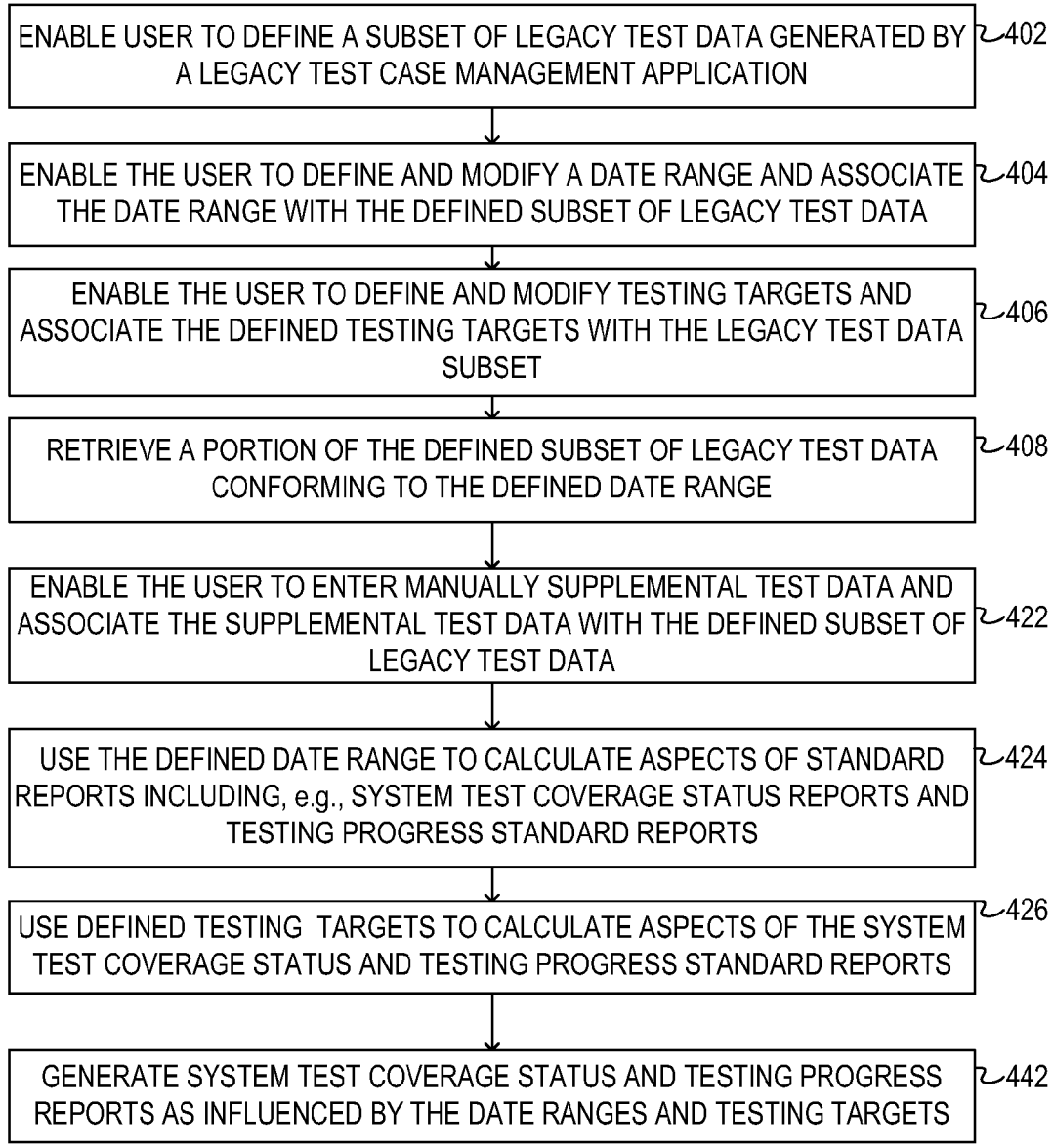
FIG. 4 is a flow diagram depicting selected elements of a test case management extension method.

Turning now to FIG. 4, a flow diagram depicts selected elements of an embodiment of a test case management method 400. In the depicted embodiment method 400 includes enabling (block 402) a user to define a subset of legacy test data generated by a legacy test case management application. An exemplary legacy test case management application is the HP Quality Center application. Defining the subset of legacy test data may include, e.g., defining hierarchical tiers of a software development framework employed within an enterprise. For example, an enterprise may employ a hierarchy that specifies a business unit tier, a program tier, encompassing a group of enterprise projects that support a product or offering, an application tier, which may refer to an information technology system that supports a specific functionality, (e.g., an application that performs risk assessments and collections), and a Project ID tier, which refers to a particular work effort on an application to implement changes or new functionality based on business needs (e.g., include mobile phone number in queries). Higher tiers may include, for example, a business unit tier that encompasses one or more programs being directed by the business unit. Other hierarchical classifications are also possible.

Method 400 as depicted in FIG. 4 further includes enabling (block 404) the user to define and modify date ranges and associate the date ranges with the defined subset of legacy test data. The method may further enable (block 406) the user to define and modify test targets and associate the defined test targets with the test data subset and to retrieve (block 408) test data conforming to the defined subset from a legacy TCM application.

Method 400 may also enable (block 422) the user to enter, manually, supplemental test data and associate the manually entered test data with the defined subset. Method 400 as depicted further includes using (block 424) the defined date ranges to calculate aspects of standard reports including, e.g., system test coverage status reports and testing progress standard reports and using (block 426) defined testing targets to calculate aspects of the system test coverage status and testing progress standard reports. For example, the testing targets may be used to provide a comparative assessment of the current status of a test program versus the testing targets. Method 400 may further include generating (block 442) system test coverage status and testing progress reports influenced by the date ranges and test targets.

Figure 5:
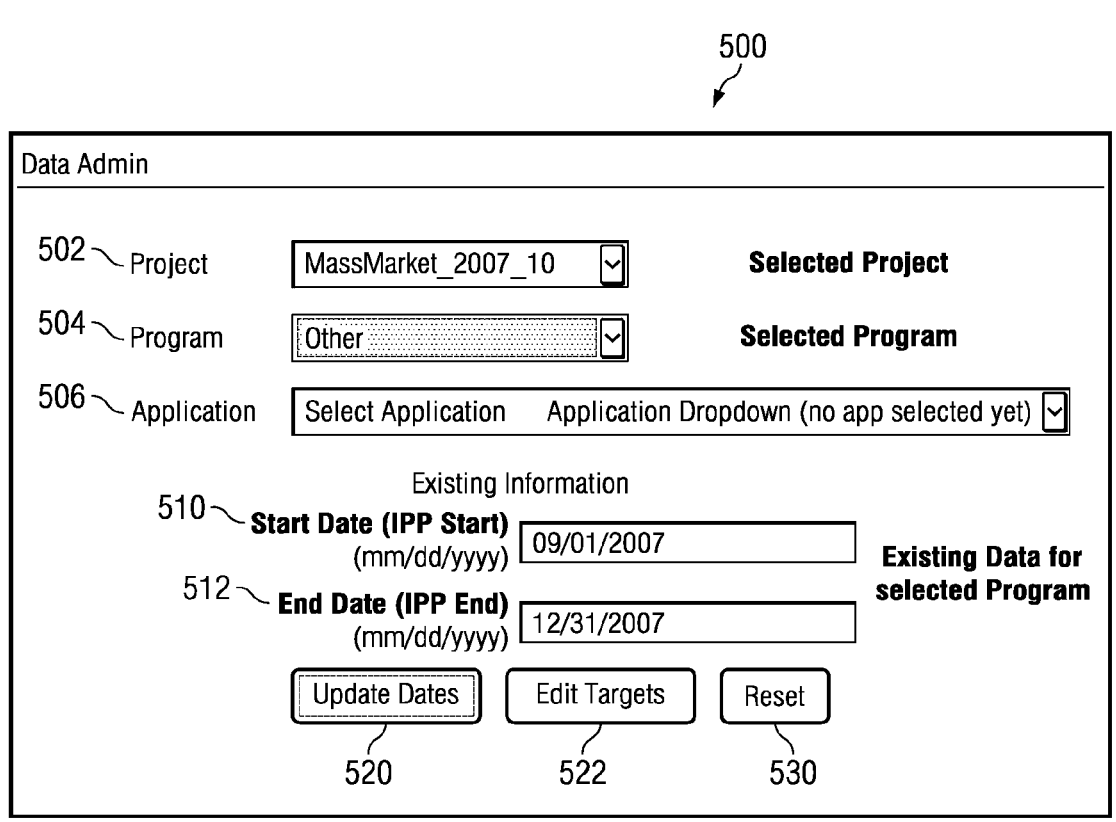
FIG. 5 depicts an exemplary embodiment of an interface for selecting a portion of preexisting or legacy test data and for indicating a date range.

Turning now to FIG. 5, an exemplary embodiment of a user interface 500 for selecting a portion of legacy test data and specifying a date range is depicted. Exemplary user interface 500 as depicted facilitates user selection of a subset of legacy test data. Selection of the subset of legacy test is achieved via selection of values for at least one of three hierarchically arranged layers or subsets of the legacy test data. In the exemplary interface 500, the subsets or tiers of the legacy data include subsets or tiers that reflect various hierarchical tiers of the information technology framework and/or hierarchical tiers of the business organization. In the depicted embodiment, which adopts terminology employed by the HP Quality Center application, the legacy test data may be selectively defined, accessed, and/or analyzed by the TCM extension application 162 at a business unit level via the "Project" input 502, a program level via the "Program" input 504, and an application level via Application input 506. The exemplary interface also supports user specification of a date range associated with the defined subset of test data. User interface 500 as shown includes a start date entry box 510, an end date entry box 512, as well as control elements or "buttons" including an "Update Dates" buttons 520 to refresh the data filtering parameters, an Edit Targets button 522 used in conjunction with a target definition interface discussed with respect to FIG. 6, and a "Reset" button 530 for resetting all fields to their default values.

When a user asserts "Edit Targets" control element 522 in interface 500 as depicted in FIG. 5 and discussed above, some embodiments may generate a target definition interface, an exemplary embodiment of which is depicted in FIG. 6. In the depicted embodiment, target definition interface 600 enables user selection of one or more test target values. In this exemplary interface, columns represent test target categories and, in FIG. 6, three categories are defined for three benchmarks, namely, a tests-executed benchmark 602, a tests passed benchmark 604, and a high severity defect benchmark 606. In this exemplary target definition interface 600, the three benchmarks are defined for each of a plurality of test cycle stages where the stages are defined according to the percentage of total test cases that have been tested or that were scheduled to be tested. As depicted in FIG. 6, for example, the rows of interface 600 correspond to test cycle stages with a first test cycle stage 610-1 being represented by the first row of interface 600, the second test cycle stage 612-2 being represented by the first row of interface 600, and so forth. Users can submit testing targets, once defined, via "Submit Targets" button 620.

FIG. 7 depicts a test data entry interface 700 supported by the TCM Extension Application 172. Interface 700 as depicted in FIG. 7 is an embodiment of a manual test data entry interface. Manual entry of test data includes defining test data values for each of a plurality of parameters. including, as depicted in FIG. 7, an "Executed" category corresponding to the number of test cases actually executed, a tests "Passed" category 706 indicative of the number of test cases passing, a tests failed category 708 and a miscellaneous category 710 for including, as an example, a category for items that are indicated as being held or blocked. Depending upon the implementation, the user may be constrained to entering test data manually via test data entry interface 700 to entering the data a specific tier or set of tiers in the hierarchy, for example, user might be constrained to enter manual test data only at the lowest hierarchical tier.

FIG. 8 depicts an interface 810 facilitating manual creation of a new entry in one of the hierarchical tiers, e.g., a new program, application, and/or project ID. In the depicted embodiment, interface 810 is invoked from the interface 500 depicted and described with respect to FIG. 5 and reproduced in FIG. 8, by selecting a value of "NEW" from one of the drop down boxes 802, 804, 806, or 808 for specifying, respectively, a business unit or project (802), a program (804), an application (806), and a Project ID (808).

The depicted embodiment of interface 810 includes a text box 812 for entering a name of the new entry, text boxes 814 and 816 for specifying date ranges, and yes/no selections for a support role indicator 820 and a regression indicator 822. In some embodiments, a user may manually enter test data after creating a new entry via interface 810.

Exemplary test data and test progress reports applicable to the TCM extension application disclosed herein are now described.

FIG. 9 illustrates an exemplary embodiment of a monthly defect cause summary report 900. Monthly defect cause summary report 900 as shown displays pre-production defect counts by month for a given period. The depicted embodiment of periodic defect cause summary report 900 is broken down into a first section 901 indicating a total for all applications broken down based on "phase found in" information and "root cause category" information. Periodic defect cause summary report 900 further includes a second section 902 indicating defect totals by application. Section 902 may repeats for each application within a selected criteria. Like section 901, section 902 is broken down based on "phase found in" information and "root cause category" information. In some embodiments, the defect data numbers in monthly defect cause summary report 900 are implemented as hyperlinks and clicking on any hyperlinked defect count will open defect details for the corresponding defects.

In embodiments for use in an HP Quality Center environment, monthly defect cause summary report 900 may be generated by selecting all defects from the Quality Center Nightly Feed (QCNF) for a selected Program/Group/Application where Type=Defect. Multiple tables may be produced when an application is not specified, e.g., one table for the grand total for all applications and individual tables for each individual application. Each table is then divided into two sections indicating (1) the phase the defects are found in and (2) the root cause category of the defects.

Figure 10:
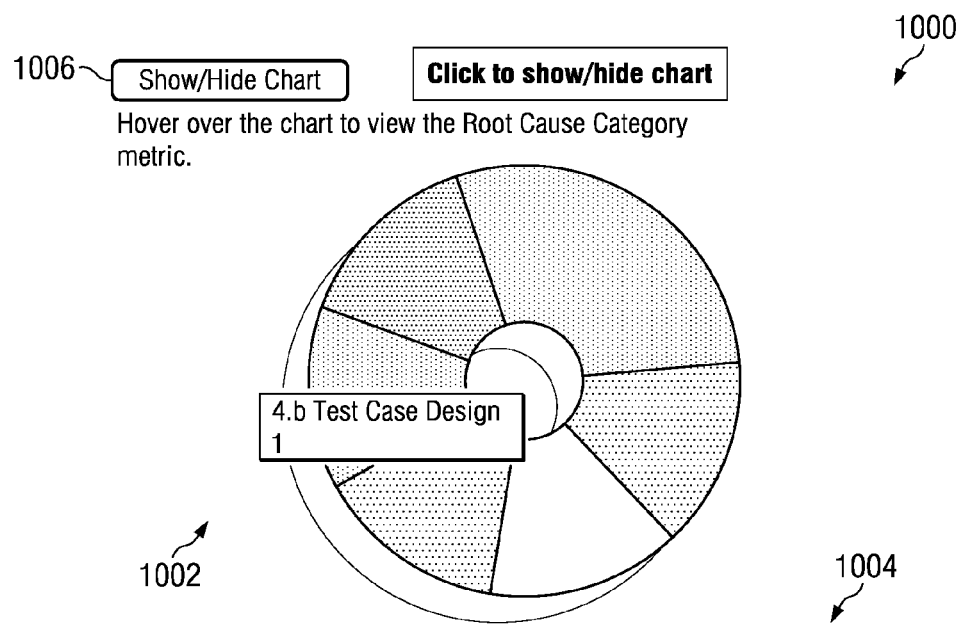
FIG. 10 depicts an exemplary embodiment of a defect root cause report.

FIG. 10 illustrates an exemplary embodiment of a defect root cause report 1000. Defect root cause report 1000 displays counts of defects categorized by root cause for selected filter criteria. Defect root cause report 1000 as depicted in FIG. 10 includes a pie chart 1002 graphically depicting defect root cause categories and a root cause table 1004 displaying the number of open or closed defects for each root cause category. Slices of pie chart 1002 represent individual root cause categories. Pie chart 1002 can be displayed or hidden via the function button 1006.

Table 1004 as shown includes additional detail indicating the number of open and closed defects in each root cause category further broken down by a severity level of the defects. In table 1004, for example, the defects in each root cause category are further broken into three severity levels, with an additional column for the total of all defects in the applicable root cause. In table 1004, each root cause category may include subcategories as well to provide even further detail. Thus, for example, the root cause identified as "3.0 Development & Testing—Code" includes at least two subcategories, namely, a subcategory 3.1 for "Work Product— Other" and a subcategory 3.6 for "Environment—Hardware." The categories in root cause table 1002 can be collapsed or expanded for summary or detail views. In some embodiments, the defect count values displayed in table 1004 are implemented as hyperlinks. In these embodiments, clicking on a hyperlink may generate a detail report for the applicable defects.

Figure 11:
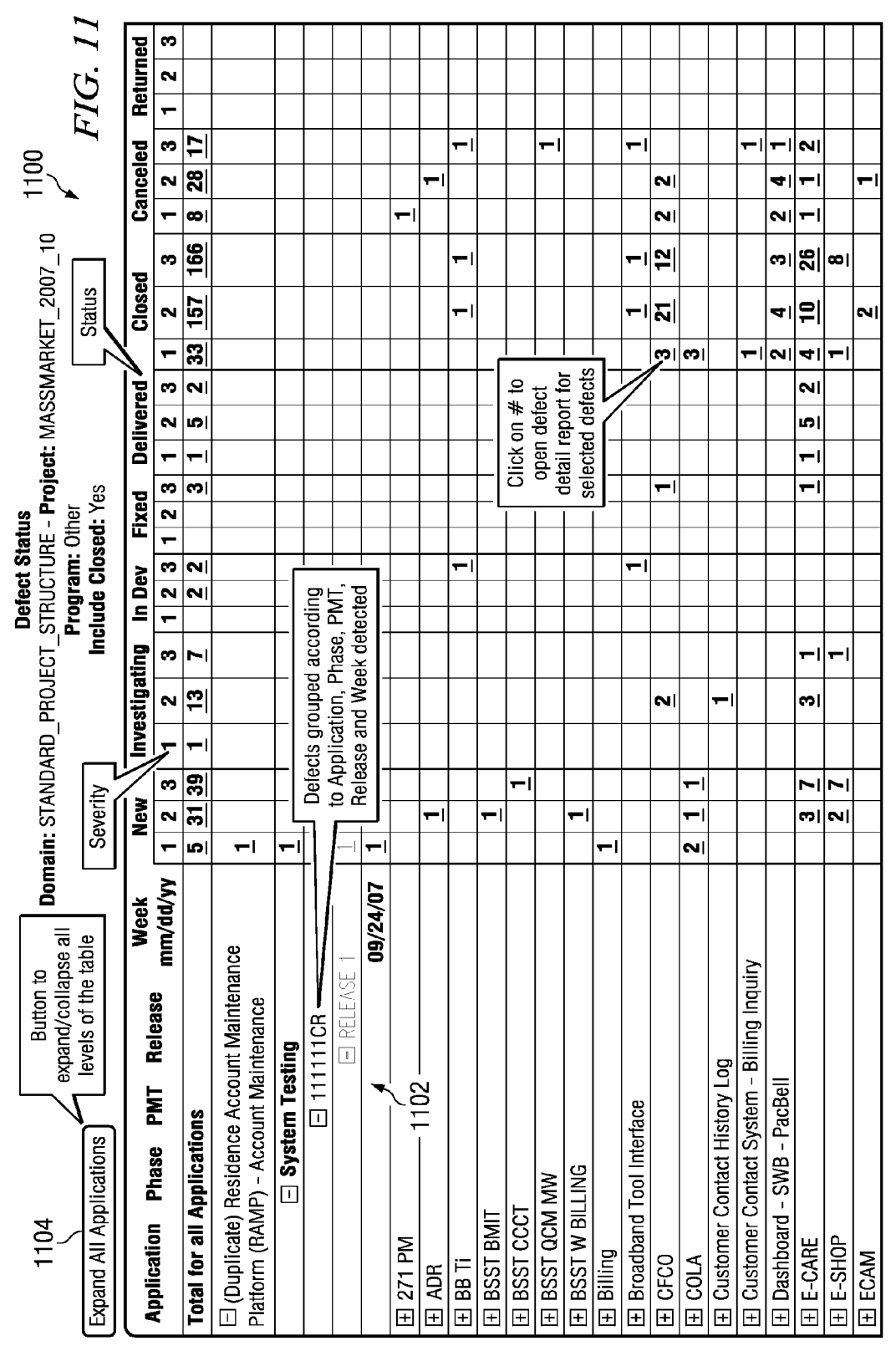

FIG. 11 depicts an embodiment of a defect status report 1100. Defect status report 1100 displays counts of defects categorized by status and subcategorized by defect severity level. The rows of resulting display can represent individual applications. Each application can be expanded to show individual counts for Phase, PMT, Release, and date as shown at reference numeral 1102. The columns of the defect status report 1100 correspond to different phases in the test phase cycle. A button 1104 is operable to collapse and expand the individual application data.

Figure 12:
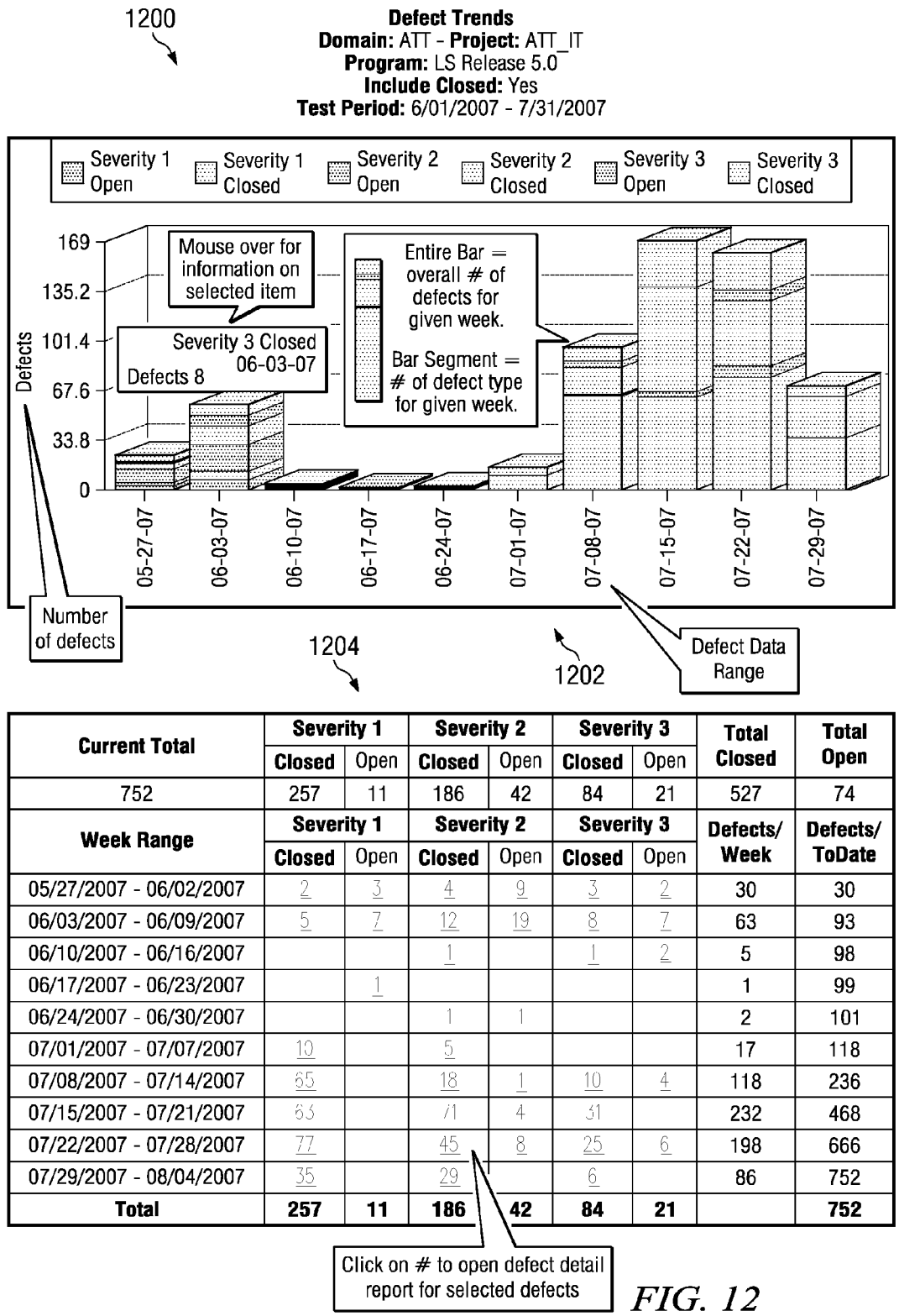
FIG. 12 depicts an exemplary embodiment of a defect trends report.

FIG. 12 illustrates an exemplary of a defect trend report 1200. The depicted embodiment of defect trend report 1200 includes a bar chart 1202 that shows counts of open and closed Severity 1, Severity 2, Severity 3, and Total defects by week for selected program(s) or application(s). Bar chart 1202 is displayed as a set of stacked bar graphs. Each bar graph corresponds to a week or other predetermined period of time. The total height of a bar graph represents the total defects for the applicable week. The bar graph includes individually selectable segments representing different severity levels and open/closed status, i.e., defect type, for the applicable defects.

Defect trend report 1200 as depicted further includes a table 1204 including weekly defect counts by defect type and total. Rows in table 1204 represent a week or other period of time while the columns represent different defect types, e.g., severity levels plus open/closed status. In embodiments that employ hyperlinks for the defect count values in table 1204, click a defect count hyperlink generates a detailed report of the corresponding defects. The table 1204 may include all or much of the raw data needed to generate bar chart 1202.

FIG. 13 depicts an embodiment of a defect turnaround time report 1300. As depicted in FIG. 13, defect turnaround report 1300 may include three reports displaying defects and their turnaround times. Defect turnaround report 1300 might, for example, display a defect delivery time display 1302, a defect retest time report 1304, and a defect closed time display that may appear only if the defect status is set to "closed." By clicking on the number of defects reported, a defect detail report for those defects will be generated. In display 1302 and 1304, turnaround time is indicated for each of the three severity levels, with each severity levels corresponding to a row in the display. Each column represents a corresponding one week period. Displays 1302 and 1304 also include information regarding an average value for the turnaround time for each level of severity.

FIG. 14 illustrates an embodiment of an open defects report 1400 categorized according to the number of days test applications remain in open status. Open defects report 1400 as shown includes rows representing different levels of defect severity while the columns in open defects report 1400 represent different one week periods and a total column for all defects of a particular severity level.

FIG. 15 illustrates an implementation of a system test coverage status report 1500. System test coverage status report 1500 as depicted in FIG. 15 indicates the number of test cases planned (column T1), executed (column T2), and passing (column T3). System test coverage status report 1500 as shown further indicates the number of severity 1 defects awaiting action (column D1), and the number of open Severity 1 defects (column D2), Severity 2 defects (column D3), Severity 3 defects (column D4), and total defects (column D5). Columns T4, T5, and T6 indicate, respectively, the percent of tests executed versus a target for tests executed and an indicator in column T6 of how the actual executed tests compare to the target executed tests.

Column T7 displays a pass rate for the actual tests executed from column T4. Columns T8, T9, and T10 indicate the percentage of cases actually passing, the percentage of cases targeted for passing, and an indicator of how the actual compares with the expected (in Column T10).

Columns D6, D7, and D8, provide information regarding the percentage of severity one defects, a target for the percentage of severity one defects, and a comparison between the actual and the target (in column D8).

As is evident from FIG. 15, system test coverage status report 1500 includes comparative columns T6, T10, and D8 that readily identify the status of a test case management situation in terms of a targeted performance versus an actual performance.

Figure 16:
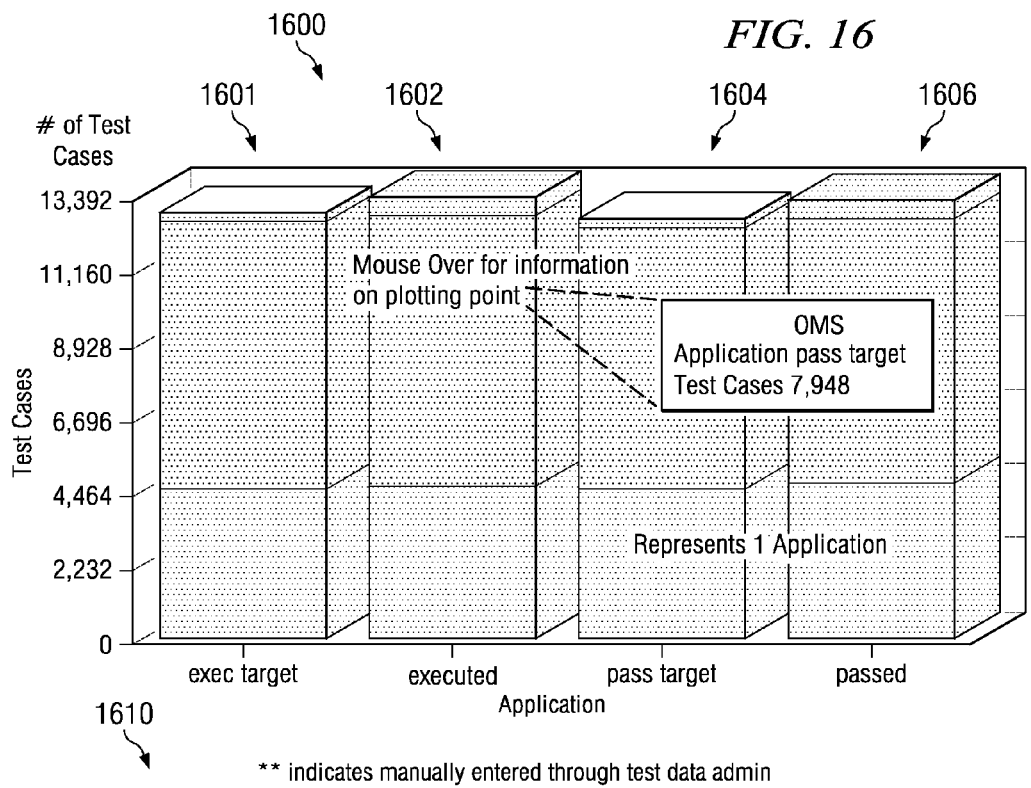
FIG. 16 depicts an exemplary embodiment of a testing progress report.

FIG. 16 illustrates an example of a testing progress report 1600. Testing progress report 1600 displays current testing progress, showing the number of executed cases versus a target, and number of passing cases versus a target. Displayed as a stacked bar graph to show overall progress versus target. Bar 1 1601 represents overall test case execution target numbers, with each color representing a different application. Bar 2 1602 represents overall executed test cases with each color representing a different application. Bar 3 1603 and Bar 4 1604 represent the same target versus actual for passing test cases. An optional data table 1610 may be displayed showing the raw data that is used to generate the chart.

Figure 17:
FIG. 17 depicts selected elements of a test management template.

In some embodiments, extensions to a legacy test management application are facilitated through the use of testing templates. FIG. 17 depicts selected elements of an exemplary test management template 1700. Test management template 1700 includes selected mandatory and automatically populated fields for use in defining and/or managing a test case.

FIG. 18 depicts selected elements of an exemplary defect management template 1800. Defect management template 1700 includes selected mandatory and automatically populated fields for use in defining and/or managing a defect. Test management template 1700 and defect management template 1800 are specifically implemented for use with the Quality Center application, but other embodiments may employ a different application.

The above disclosed subject matter is to be considered illustrative, and not restrictive, and the appended claims are intended to cover all such modifications, enhancements, and other embodiments which fall within the true spirit and subset of the present disclosure. Thus, to the maximum extent allowed by law, the subset of the present disclosure is to be determined by the broadest permissible interpretation of the following claims and their equivalents, and shall not be restricted or limited by the foregoing detailed description.

What is claimed is:

1. A method of performing test case management for a software development project, the method comprising:
    receiving user input defining:
        a test data subset comprising a portion of test data, wherein the test data is indicative of a result of a test executed by a test case management application, wherein the test data subset is associated with the software development project;
        a date range for the test data; and
        a test target for the test data, the test target corresponding to a test benchmark category;
    generating filtered test data by filtering the test data subset based on the date range;
    determining, based on the filtered test data, a test value for the test benchmark category;
    comparing the test value to the test target;
    generating a report including information indicating a result of the comparing; and
    receiving user input defining manually entered test data;
    wherein the test data and the test data subset are hierarchically arranged, wherein the date range defined for the test data is inherited by the test data subset; and
    wherein the test data includes data indicating a number of tests passed, a number of tests executed, and a number of defects.

2. The test case management method of claim 1, wherein the test case management application includes elements of an HP Quality Center application.

3. The test case management method of claim 1, wherein the test data subset is one of a plurality of test data subsets, wherein the plurality of test data subsets includes a business unit subset, a program subset, and an application subset, wherein the business unit subset includes test data associated with a business unit within an enterprise, the program subset includes test data associated with a group of projects supporting an offering of the business unit, and the application subset includes test data associated with an information technology resource pertaining to a defined functionality.

4. The test case management method of claim 1, wherein the user input defining the date range includes:
    user input defining a subset date range for a selected portion of the test data subset; and
    wherein the method includes:
        applying the subset date range to a subordinate subset, wherein the subordinate subset is hierarchically lower than the selected portion of the test data subset.

5. The test case management method of claim 1, wherein the user input defining the test target includes user input defining test targets for a plurality of test cycle stages.

6. The test case management method of claim 5, wherein the test cycle stages are associated with corresponding percentages of planned tests.

7. The test case management method of claim 5, wherein the test targets include a tests-executed target, a tests-passed target, and a severe defects target.

8. The test case management method of claim 1, wherein the receiving of user input defining the test target includes:
receiving input defining the test target for the test data subset; and
applying the test target to a subordinate subset of the test data subset, wherein the subordinate subset is hierarchically lower than the test data subset.

9. The test case management method of claim 8, wherein the user input defining the manually entered test data defines the manually entered test data at a lowest subset of the test data.

10. The test case management method of claim 1, wherein the report is selected from a system test coverage status report and a test progress report.

11. A non-transitory computer readable medium including computer executable program instructions for facilitating test case management for a software development project, the program instructions including instructions that, when executed by a computer, perform operations comprising:
providing a user interface enabling a user to define a date range, a test target for a test benchmark category, and a test data subset, the test data subset comprising a subset of test data, wherein the test data is indicative of a result of a test executed by a test case management application;
generating filtered test data by filtering the test data subset based on the date range;
generating a test progress report based on the filtered test data, wherein the test progress report indicates a result of a comparison between the test target and a test value derived from the filtered test data; and
receiving user input defining manually entered test data;
wherein the test data and the test data subset are hierarchically arranged, wherein the date range and test target defined for the test data are inherited with respect to the test data subset; and
wherein the test data includes test data indicating a number of tests passed, a number of tests executed, and a number of defects.

12. The non-transitory computer readable medium of claim 11, wherein the operations include providing the user interface responsive to a request from a web browser.

13. The non-transitory computer readable medium of claim 11, wherein the test target is selected from a tests executed target, a tests passed target, and a high severity defect target.

14. The non-transitory computer readable medium of claim 11, wherein the user interface enabling the user to define the test data subset is operable to define a product group subset, a program subset within the product group subset, and an application subset within the program subset.

15. A test case management system, comprising:
a processor;
a storage medium accessible to the processor and including program instructions, executable by the processor, for analyzing test data indicative of a result of a test executed by a test case management application, the program instructions when executed by the processor, performing operations comprising:
enabling a user to define a set of test targets;
enabling the user to define a date range;
generating filtered test data by filtering the test data based on the date range and the test targets;
generating a report based on the filtered test data, wherein the report is selected from a test coverage status report and a test progress report; and
receiving user input defining manually generated test data;
wherein the test data is arranged according to a set of hierarchical tiers and wherein the instructions for enabling the user to define the date range include instructions for enabling the user to define the date range at a first tier of the set of hierarchical tiers, wherein the date range is applied to a subordinate tier of the set of hierarchical tiers, wherein the subordinate tier is hierarchically below the first tier; and
wherein the test data includes test data indicating a number of tests passed, a number of tests executed, and a number of defects.

16. The test case management system of claim 15, wherein the operations for enabling the user to select values for each of the set of hierarchical tiers.

17. A method of extending features provided by a test case management application, comprising:
responsive to user input defining a date range and specifying a test target:
generating filtered test data by filtering, based on the date range, test data indicative of a result of a test executed by the test case management application;
generating a test report based on the filtered test data, wherein the test report is indicative of a test status relative to the test target; and
receiving user input defining manually entered test data;
wherein the user input defines the date range and the test target with respect to a first tier of an organizational level and wherein generating the report comprises generating a report at a second tier of the organizational level, wherein the date range and the test target are inherited by the second tier from the first tier and used to generate the report; and
wherein the test data includes test data indicating a number of tests passed, a number of tests executed, and a number of defects.

18. The method of claim 17, wherein specifying a test target comprises specifying a plurality of test targets for a plurality of test target benchmark categories and wherein the test report is indicative of a test status for the test target benchmark categories relative to a respective test target.

* * * * *